May 5, 1970  N. L. BROWN  3,510,761
COMPENSATED SALINOMETER
Original Filed March 4, 1963  4 Sheets-Sheet 1
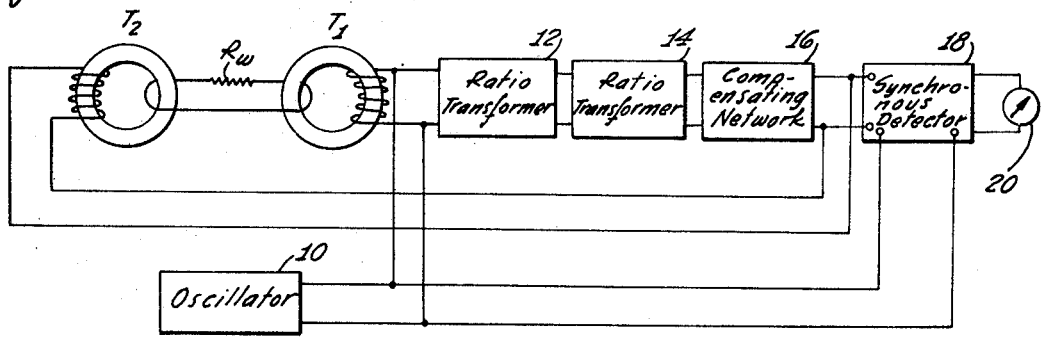
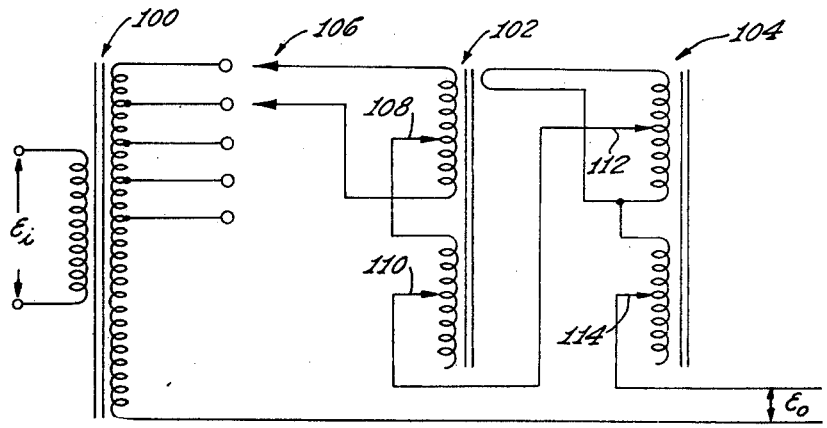
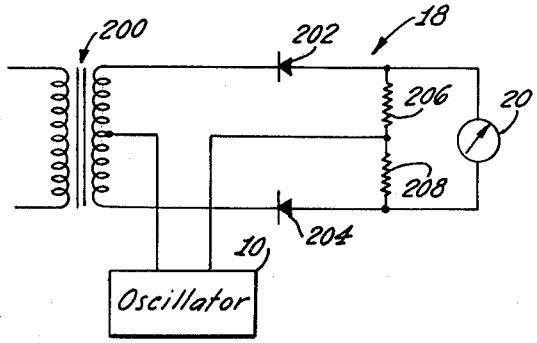
INVENTOR:
Neil L. Brown
Smyth, Costow & Pavitt
Attorneys

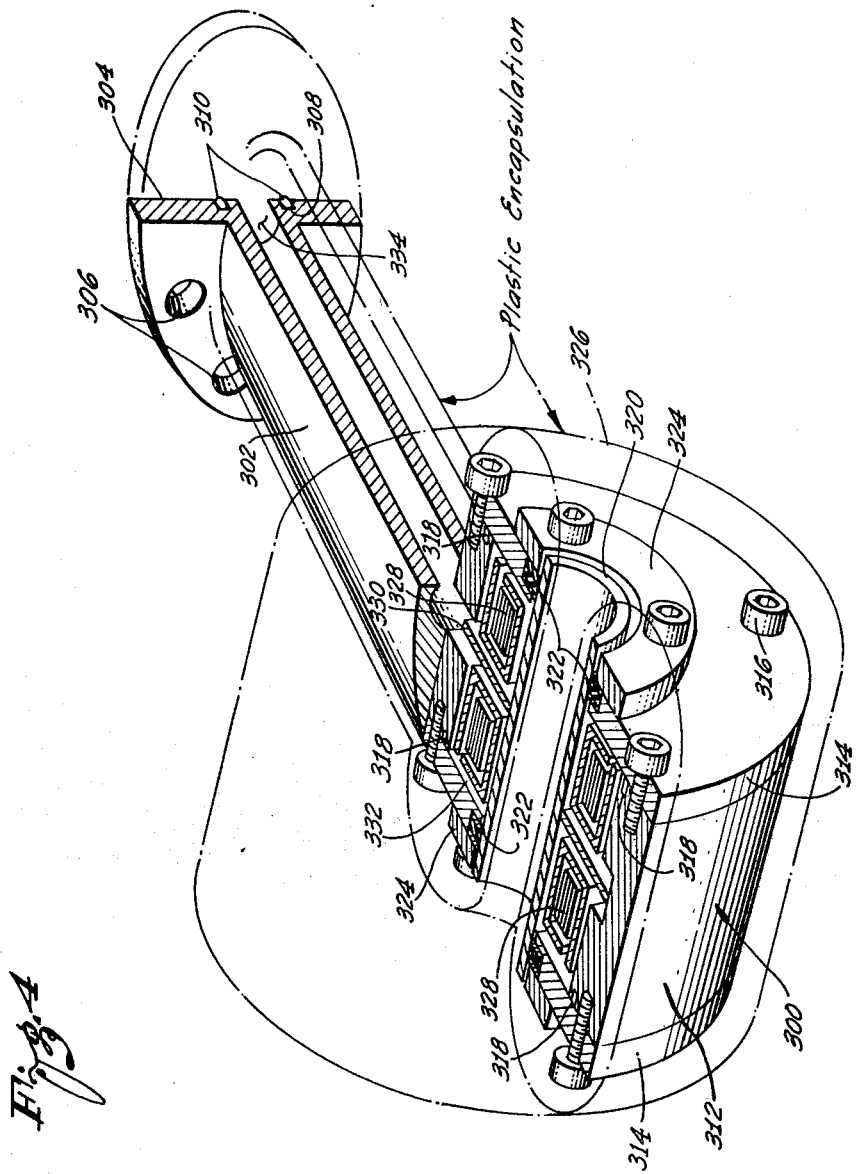

INVENTOR:
Neil L. Brown
Attorneys

INVENTOR:
Neil L. Brown

Attorneys

United States Patent Office 3,510,761
Patented May 5, 1970

3,510,761
COMPENSATED SALINOMETER
Neil L. Brown, San Diego, Calif., assignor to The Bissett-Berman Corporation, Santa Monica, Calif., a corporation of California
Original application Mar. 4, 1963, Ser. No. 262,396, now Patent No. 3,419,796, dated Dec. 31, 1968. Divided and this application July 24, 1968, Ser. No. 765,720
Int. Cl. G01r 27/22
U.S. Cl. 324—30                                                9 Claims

ABSTRACT OF THE DISCLOSURE

This invention relates to a system for measuring the salinity of sea water. The system produces a first alternating signal in accordance with the salinity of the sea water. The system also produces a second alternating signal having a particular phase relationship transverse to the phase of the first signal. The first and second signals are combined in the system to produce a resultant signal having a phase dependent upon the characteristics of the first signal. The resultant signal is used in the system to obtain variations in the frequency of the first signal in accordance with the characteristics of the resultant signal. In this way, the frequency of the first signal indicates the salinity of the sea water.

---

Figure 5:
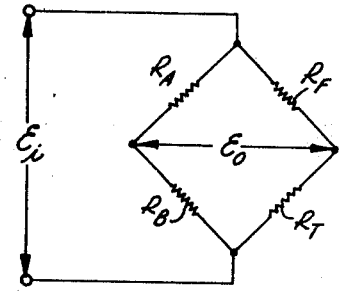

This is a division of application Ser. No. 262,396 filed Mar. 4, 1963, now Pat. No. 3,419,796, issued Dec. 31, 1968. This invention relates to a measuring system for determining the electrical conductivity of a liquid. More specifically, the invention relates to the measurement of electrical conductivity in representation of the salinity of the liquid. The invention also relates to the measurement of the salinity of sea water in its natural location without the necessity of obtaining samples of the sea water to determine the salinity at a later time.

Various methods have been used in the past to measure the salinity of sea water. For example, a prior method used a titration process as a salinometer. It is now well established that the measurement of salinity by electrical conductivity constitutes an improved method over that of titration. This method has both greater speed and convenience with a higher accuracy.

The prior art has taught various ways of sensing the electrical conductivity of the sea water. For example, glass conductivity cells having platinum electrodes have been used as sensors in laboratory-type salinometers. These cells may be used as long as they are not subjected to organic or inorganic fouling or extreme environmental conditions. The glass cells, therefore, cannot be used when the measurement of salinity is to be made in the natural location.

It has also been proposed to use capacitively coupled electrodes as the sensor for measuring electrical conductivity or salinity of sea water. This type of instrument, however, requires a very high frequency input signal. Accurate measurements are difficult to perform when high frequencies are used, especially when the measurement is to be performed on the sea water in its natural location.

It appears, therefore, that an inductively coupled sensor offers the greatest possibility for developing an accurate instrument for the measurement of salinity of sea water in its natural location. This invention relates to improvements in inductively coupled salinometers. Since the salinometer of the present invention is used at varying environmental conditions, this application proposes means for compensating for the varying environmental conditions. For example, the invention incorporates temperature-compensating means of an improved type over prior art devices.

The invention of the present application uses a bridge-type of temperature compensator with thermally responsive impedances located in the arms of the bridge. More specifically, the temperature compensation circuit may consist of a double bridge. The double bridge structure can be further improved by the use of a temperature-sensitive impedance element located to couple compensating signals from one portion of the double bridge to the other portion of the double bridge.

This invention also proposes means to compensate for the effects of pressure and temperature on a salinometer using an inductively coupled sensor. The pressure compensation is accomplished by a variable impedance controlled by a pressure responsive element. The effect of temperature on the pressure coefficient is also compensated by a variable impedance obtained from a temperature responsive element.

Also, the invention relates to an improved inductively coupled sensor having specific structure to eliminate the effects of fouling and corrosion and high pressure and temperature variations on the sensor.

The invention also provides improved circuitry within the measuring system to provide an indication of the salinity by utilizing an output voltage to input voltage relationship of a measuring bridge to control the frequency of a phase shift oscillator. The frequency of the oscillator, therefore, has values in representation of the salinity of the water, and a measurement of the frequency of the oscillator may be used to give an indication of the salinity.

Figure 6:
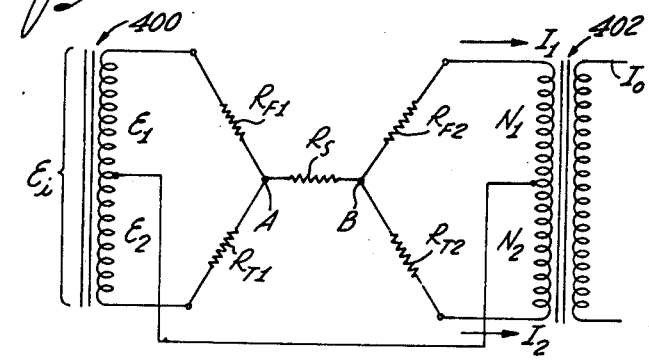
Figure 7:
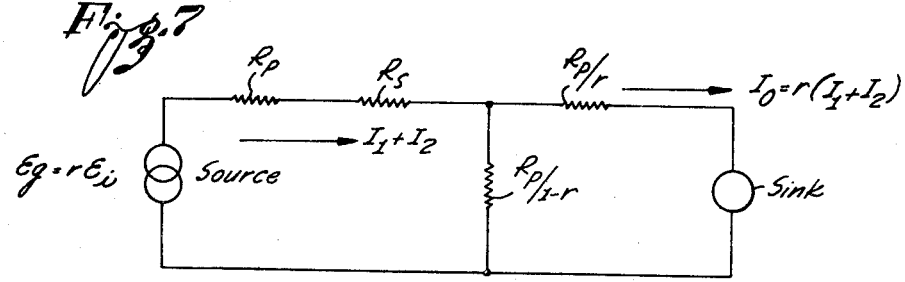
Figure 8:
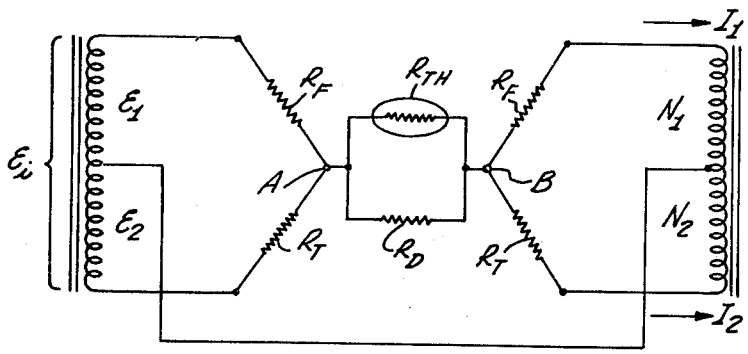
Figure 9:
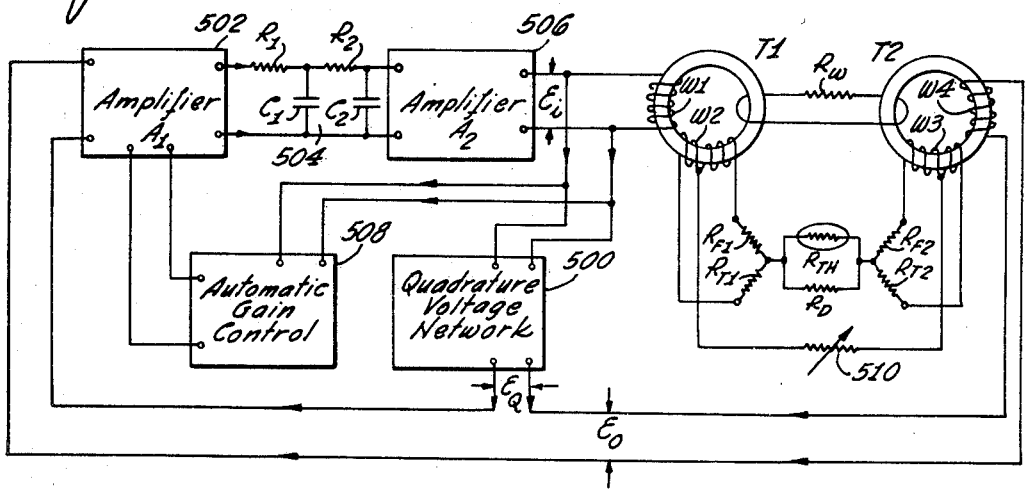
Figure 10:
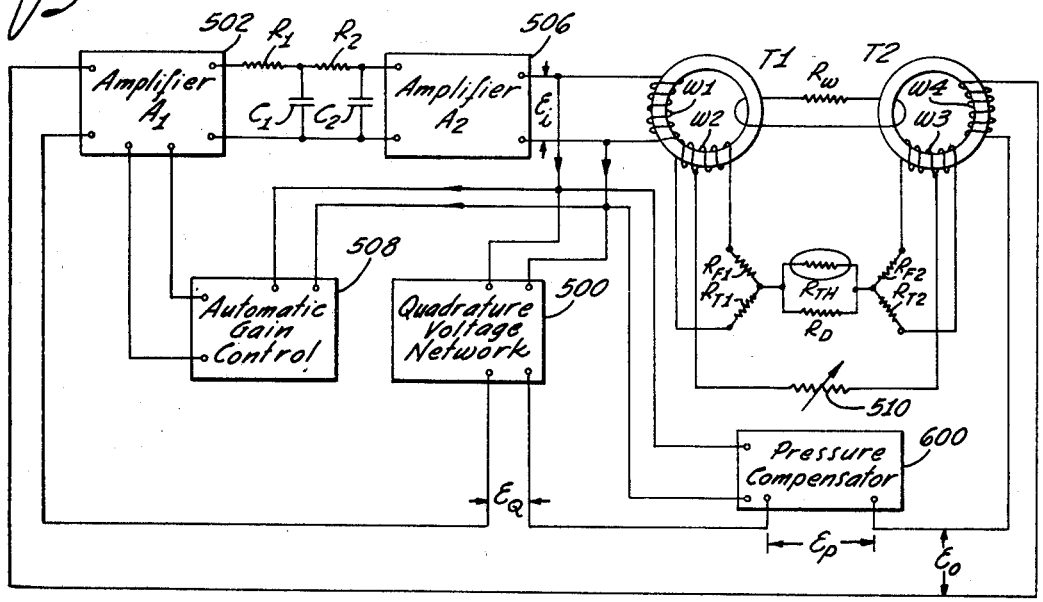
Figure 11:
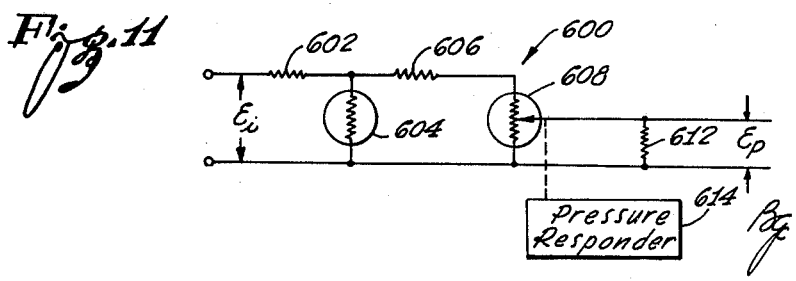

The various concepts of the invention of the present application will become clearer with reference to the following figures wherein:

FIG. 1 is a block diagram of a measuring system incorporating features of this invention;
FIG. 2 is a schematic diagram of a ratio transformer which may be included within the system of FIG. 1;
FIG. 3 is a schematic diagram of a portion of the system of FIG. 1;
FIG. 4 is a cutaway view of a sensor assembly which may be used with a measuring system for determining the salinity of a liquid in its natural location;
FIG. 5 is a bridge compensating network which may be used in the system of FIG. 1;
FIG. 6 is a first embodiment of a double-bridge compensating network which may be used with the system of FIG. 1;
FIG. 7 is an equivalent circuit diagram of the double bridge shown in FIG. 6 for use in explaining the operation of the double bridge of FIG. 6;
FIG. 8 is a second embodiment of a double-bridge compensating circuit which may be used with the system of FIG. 1;
FIG. 9 is a second embodiment of a measuring system, partly in block and partly in schematic form;
FIG. 10 is a measuring system similar to that shown in FIG. 9 but additionally including pressure compensation; and
FIG. 11 is a circuit diagram of a pressure transducer and pressure compensator which may be used with the system of FIG. 10.

In FIG. 1 the measuring instrument includes a pair of transformers $T_1$ and $T_2$. The transformers are coupled together by a single loop which includes the sea water. The resistance of the sea water is designated as a resistor $R_W$. The input signal to the transformer $T_1$ is produced by an oscillator 10. The oscillator, for example, may have a frequency of 10 kilocycles per second. The output signal from the oscillator 10 is also applied to a first ratio transformer 12.

The output from the first ratio transformer 12 is then coupled through a second ratio transformer 14 to a compensating network 16. The output from the compensating network is applied to a synchronous detector 18. A meter 20 monitors the output of the synchronous detector. An input to the synchronous detector is also taken from the second transformer $T_2$. Finally, the oscillator 10 supplies a reference signal to the synchronous detector 18.

The signal supplied by the oscillator 10 is coupled through the transformers $T_1$ and $T_2$ with the amount of coupling determined by the conductivity of the sea water. This is represented by the resistance $R_W$ which is also in representation of the salinity of the sea water. The transformers $T_1$ and $T_2$ and the resistance $R_W$, in combination with the ratio transformers 12 and 14 and the compensating network 16, form a loop for the signal applied by the oscillator 10. If the windings of the transformers $T_1$ and $T_2$ are arranged so as to produce opposite polarities, the ratio transformers 12 and 14 may be adjusted to produce a net flux of zero within the system. This results in a magnetomotive force to zero acting on the transformer $T_2$ and the output meter 20, therefore, may operate as a null indicator to indicate that the entire system is balanced. The conductivity or salinity of the sea water can then be determined by the settings of the ratio transformers 12 and 14.

The compensating network 16 may include means that are responsive to the temperature and/or pressure of the sea water. This compensating network 16 will be effective to permit a direct readout of the salinity of the sea water and eliminate the necessity for any conversion of the readings.

Ordinarily the ratio transformer 12 is set to unity and the ratio transformer 14 is adjusted to balance the measuring circuit when the sensor is immersed in a liquid having a known conductivity. The sensing apparatus is then immersed in the unknown liquid and the first ratio transformer is adjusted to produce a balanced condition in the circuit as indicated by a null reading of the meter 20. The amount of adjustment of the first ratio transformer, therefore, is a direct determination of the ratio of the conductivity of the liquid such as sea water to the known sample.

FIG. 2 is a schematic of a ratio transformer which may be either ratio transformer 12 or 14 illustrated in FIG. 1. The ratio transformer consists of three internal transformers designated as 100, 102 and 104. There is a four-position main dial 106 located between transformer 100 and transformer 102 and four decade dials 108, 110, 112 and 114 located within transformers 102 and 104. The input $E_i$ is to the transformer 100 and the output $E_o$ is the sum of the outputs of the transformers 100, 102 and 104. The main dial may be adjusted to give output voltages from the transformer 100 in relation to the input voltage to the transformer 100 having, for example, ratios of 0.8, 0.9, 1.0 and 1.1. The transformers 102 and 104 in combination with the switches 108, 110, 112 and 114 provide for a total voltage change within the ratio transformer as small as one part in 100,000. The switches 108, 112 and 114 each have ten positions. The ratio of turns between the windings associated with switches 108 and 110, and 112 and 114 is ten to one. The voltage ratio between transformers 102 and 104 is one hundred to one.

FIG. 3 illustrates a circuit diagram of the synchronous detector 18. The synchronous detector 18 includes an input transformer 200. A pair of diodes 202 and 204 both poled in the same direction are connected to the opposite ends of the secondary of the input transformer 200. A pair of resistances 206 and 208 are connected in series across the plates of the diodes 202 and 204. The meter 20 is applied to give an indication of the voltage across the resistance 206 and 208. The reference voltage from the oscillator 10 is connected between a center tap position on the secondary of the transformer 200 and the juncture of the resistances 206 and 208.

When the input to the transformer 200 is zero, the meter 20 has a reading of zero. The synchronous detector at this time is in a balanced state since the current flowing in the detector circuit produces voltages across the resistors 206 and 208 which cancel each other. When an input voltage is applied the secondary winding of the transformer 200 has a voltage across it in accordance with the amplitude and polarity of the input voltage. This voltage unbalances the detector circuit and the meter 20 reads either positive or negative in accordance with the input voltage to the transformer 200. The synchronous detector 18, therefore, operates to give an indication of an unbalanced condition in the measuring circuit of FIG. 1. When the ratio transformers are adjusted to produce a balanced condition there is no input to the transformer 200. The synchronous detector is, therefore, used as a null indicator.

FIG. 4 illustrates a cutaway view of a sensor assembly which may be used with any of the described embodiments of the invention. The sensor includes a housing structure 300 which, for example, may be constructed of stainless steel. The housing resembles a toroidal section having a strut 302 extending from one side of the toroidal section. A mounting flange 304 is disposed at the end of the strut 302. The mounting flange includes a plurality of holes 306 for use in mounting the sensor. Sealing means are incorporated in the flange 304 and include a groove 308 containing an O-ring 310.

The toroidal portion of the housing may be composed of a plurality of sections. For example, the toroidal portion may include a right circular cylindrical member 312 having end flanges 314. The member 312 and flanges are connected together by bolts 316 while a sealed relationship is maintained by O-rings 318.

An inner member 320 passes through the end flanges 314 and is insulated from the rest of the housing. The inner linear member 320 may also be composed of stainless steel. The member 320 is held in sealed relation to the rest of the housing by the use of insulating sleeves and O-rings 322. Circular flanges 324 force the sleeves and O-rings 322 into a sealed relationship to maintain the member 320 in position. The entire housing is encapsulated in a non-conducting material 326 such as a non-conducting plastic material.

Enclosed within the housing 300 are a pair of toroidal transformers 328. The transformers incorporate electrostatic shielding material 330 and magnetic shielding material 332. The magnetic shielding material 332 is used to shield the cores of the transformers 328 one from the other. The associated windings and leads are shielded electrostatically. The magnetic shielding also insures that equal voltages are induced in each secondary turn of the transformers 328 so that high accuracy is achieved in the secondary voltage ratio. The required leads to the windings of the transformers 328 are fed through an opening 334 in the strut 302.

The stability of the sensor depends on the stability of the geometry of the sensor, particularly that of the center hole of the toroidal structure. Any changes in this center hole due to marine fouling cause changes in the calibration of the instrument. However, the inductively coupled sensor is much less sensitive to fouling than other types of conductivity instruments. Aside from this, certain general methods greatly decrease the effects of fouling.

For example, it is advantageous to use large diameter center holes so that the holes are less affected on a percentage basis by the fouling organisms and also the holes are easier to maintain in a clean condition. Another approach is the use of anti-fouling compounds directly on the critical areas of the sensor. As a prevention from the fouling of large objects such as seaweed, a large copper screen spaced at least several feet away could be placed around the sensor. This does not interfere with measurements but prevents any large objects from fouling the sensor.

FIG. 5 illustrates a temperature-compensating circuit which may be used as the temperature-compensating circuit 16 in the system of FIG. 1. The temperature-compensating circuit of FIG. 5 is a single bridge which includes resistances $R_A$, $R_F$, $R_B$ and $R_T$. In the arrangement shown, $R_A = R_B$ and $R_T$ is a platinum resistance thermometer. The platinum resistance thermometer is wound from pure platinum and is thoroughly annealed so as to be very stable. The resistor $R_T$ is disposed in the sea water to be measured whereby it will be at the same temperature as the water. Normally, it will be mounted on or near the sensor assembly. The input to the circuit $E_i$ is applied between the juncture of resistors $R_A$ and $R_F$ and the juncture of resistors $R_B$ and $R_T$. The output $E_o$ is taken across the junction of resistors $R_A$ and $R_B$ and the junction of resistors $R_F$ and $R_T$.

The output voltage $E_o$ is given by:

$$E_o = E_i \frac{R_T}{R_T + R_F} - E_i \frac{R_B}{R_B + R_A}$$

Since $R_A = R_B$ $$\frac{E_o}{E_i} = \frac{R_T}{R_T + R_F} - \frac{1}{2} = \frac{1}{2} \frac{R_T - R_F}{R_T + R_F} \quad (1)$$

Now $R_T = R_o(1+at)$ where
$R_o$ = resistance of thermometer at 20° C.
$a$ = temperature coefficient of the thermometer at 20° C.
$t = T - 20°$ C.
$T$ = temperature of the thermometer Then $$\frac{E_o}{E_i} = \frac{1}{2} \frac{R_o(1+at) - R_F}{R_o(1+at) + R_F}$$

Let $R_F/R_o = b$

Then $$\frac{E_o}{E_i} = \frac{1}{2} \frac{1+at-b}{1+at+b} \quad (2)$$

The temperature coefficient $A(t)$ of the ratio $E_o/E_i$ is given by:

$$A(t) = \frac{E_i}{E_o} \times \frac{d\frac{E_o}{E_i}}{dt} = \frac{2ab}{(1+at)^2 - b^2} \quad (3)$$

Table 1 shows the temperature coefficient of sea water at various temperatures.

TABLE I

Temperature (° C.): Sea water temperature coefficient (percent/° C.)

| Temperature (° C.) | Coefficient |
|---|---|
| 0 | 2.999 |
| 5 | 2.708 |
| 10 | 2.481 |
| 15 | 2.286 |
| 20 | 2.118 |
| 25 | 1.976 |

Now the temperature coefficient of resistance of pure platinum wire (annealed) is +0.392%/° C. at 20° C. If we make $A(t)$ in Equation 3 above equal 2.118%/° C., i.e. equal to the T.C. of sea water at 20° C. and solve for $b$, we get:

$$0.02118 = \frac{2 \times 0.00392 b}{1 - b^2}$$

then $$b = 0.831 \quad (4)$$

If we use this value of $b$ to compute the temperature coefficient of the bridge $A(t)$ at other temperatures, it is found that $A(t)$ somewhat diverges from the temperature coefficient of sea water, e.g. at $$t = -20$$

i.e.

$$T = 0°$$

$$A(t) = \frac{2 \times .00392 \times 0.831}{(1 - .00392)^2 - 0.831^2} = 0.03495$$

i.e. 3.495%/° C.

As shown in Table I, the temperature coefficient of sea water at 0° C. is 2.999%/° C.

Although the circuit of FIG. 5 compensates for temperature changes in the measuring system, a more correct compensation is given by the circuit illustrated in FIG. 6. The input to the circuit of FIG. 6 is shown at $E_i$. The input is through a transformer 400 which is subdivided by a center tap to have two voltage components $E_1$ and $E_2$. The two portions of the transformer 400, in combination with resistances $R_{F1}$ and $R_{T1}$, form a first bridge circuit. The output from the compensating network of FIG. 6 is through transformer 402 and the primary winding of transformer 402 is also subdivided into two portions indicated at $N_1$ and $N_2$. These two portions of the winding in combination with resistances $R_{F2}$ and $R_{T2}$ constitute a second bridge.

The first and second bridges are connected by a resistance $R_S$ at points A and B and the two center taps on transformers 400 and 402 are also connected together. In FIG. 6, $R_{F1} = R_{F2}$, $R_{T1} = R_{T2}$, $E_1 = E_2 = \frac{1}{2} E_i$, $N_1 = N_2$, $I_o = I_1 - I_2$ and $R_{T1}$ and $R_{T2}$ and platinum resistance thermometers which may be disposed in the sea water such as by mounting on the sensor assembly of FIG. 4.

However if we analyze the double bridge circuit shown in FIG. 6, the following results are obtained. The initial assumptions are that the transformers $T_1$ and $T_2$ have negligible winding resistance and leakage reactance, and that the voltage across the windings of $T_2$ is zero. The net output current $$I_o = I_1 - I_2 \quad (5)$$

and $$I_1 + I_2 = \frac{E_o}{R} \quad (6)$$

where $E'_o$ = open circuit output voltage at point A $$= \frac{E_i R_{T1}}{R_{T1} + R_{F1}} - E_2 = \frac{E_i}{2} \left[ \frac{2R_{T1}}{R_{T1} + R_{T1}} \right] - 1$$

$$= \frac{E_i}{2} \left[ \frac{R_{T1} - R_{F1}}{R_{T1} + R_{F1}} \right] \quad (7)$$

and $R$ = total resistance around the circuit $$= \frac{R_{T1} R_{F1}}{R_{T1} + R_{F1}} + R_s + \frac{R_{T2} R_{F2}}{R_{T2} + R_{F2}}$$

Since $$R_{T1} = R_{T2} = R_T$$

and $$R_{F1} = R_{F2} = R_F$$

$$R = \frac{2 R_T R_F}{R_T + R_F} + R_s$$

$$\therefore I_1 + I_2 = \frac{\frac{E_i}{2} \left[ \frac{R_T - R_F}{R_T + R_F} \right]}{\frac{2 R_T R_F}{R_T + R_F} + R_s} \quad (8)$$

Now the net output current $$I_o = I_1 - I_2$$

and $$I_1 = (I_1 + I_2)\left(\frac{R_T}{R_T + R_F}\right)$$

$$I_2 = (I_1 + I_2)\left(\frac{R_T}{R_T + R_F}\right)$$

(9)

$$\therefore I_o = (I_1 - I_2)\frac{R_T - R_F}{R_T + R_F}$$

$$= \frac{E_i}{2}\left[\frac{R_T - R_F}{R_T + R_F}\right]^2 \times \frac{1}{\frac{2R_T R_F}{R_T + R_F} + R_s}$$

$$\therefore \frac{I_o}{I_1} = \frac{1}{2}\left[\frac{R_T - R_F}{R_T - R_F}\right]^2 \times \frac{1}{\frac{2R_T R_F}{R + R_F} + R_s} \quad (10)$$

$$= \frac{1}{2}\left[\frac{R_o(1+at-)R_F}{R_o(1+at+)R_F}\right]^2 \times \frac{1}{\frac{2R_o(1+at)R_F}{R_o(1+at)+R_F} + R_s} \quad (11)$$

Now the temperature coefficient $A(t)$ of $I_o/E_i$ is given by $$A(t) = \frac{E_i}{E_o}\frac{d\frac{I_Q}{E_i}}{d_i}$$

By solving for $A(t)$=the temperature coefficient of sea water at 15° C. i.e. 0.02286 for various values of $R_s$, the following results are obtained as summarized in Table II below for $R_T$=100.00 at 20° C.

TABLE II

| Temperature (° C.) | $R_s$ (ohms) | $R_F$ (ohms) | $A(t)$, percent/° C. | Compensation error (percent) |
|---|---|---|---|---|
| 0 | 0 | 71.1700 | 3.069 | +.007 |
| 5 | 0 | 71.1700 | 2.763 | +.055 |
| 10 | 0 | 71.1700 | 2.505 | +.024 |
| 15 | 0 | 71.1700 | 2.286 | .000 |
| 20 | 0 | 71.1700 | 2.099 | −.019 |
| 25 | 0 | 71.1700 | 1.935 | −.041 |
| 0 | 120 | 70.2361 | 3.020 | +.021 |
| 5 | 120 | 70.2611 | 2.734 | +.026 |
| 10 | 120 | 70.2361 | 2.492 | +.012 |
| 15 | 120 | 70.2361 | 2.286 | .000 |
| 20 | 120 | 70.2361 | 2.108 | −.010 |
| 25 | 120 | 70.2361 | 1.952 | −.024 |
| 0 | ∞ | 69.5700 | 2.986 | −.013 |
| 5 | ∞ | 69.5700 | 2.714 | +.006 |
| 10 | ∞ | 69.5700 | 2.484 | +.003 |
| 15 | ∞ | 69.5700 | 2.286 | .000 |
| 20 | ∞ | 69.5700 | 2.114 | −.004 |
| 25 | ∞ | 69.5700 | 1.963 | −.013 |

[1] Difference between $A(t)$ and last column in Table I.

There is an extremely accurate match between $A(t)$ and the temperature coefficient of sea water. $R_s$=infinity simply means that in a real circuit, $R_s$ would have to be a constant current generator. Another way of achieving the same result is shown below.

If we examine the significance of Equation 10, it can be shown that the circuit in FIG. 6 can be represented by the equivalent circuit shown in FIG. 7.

$$r\left(=\frac{R_T - R_F}{R_T + R_F}\right)$$

is the ratio of the open circuit output voltage to the input voltage of the left hand bridge shown in FIG. 6 and the ratio of the input current to the net output current of the right hand bridge shown in FIG. 6. The total resistance in series with the source and the sink is equal to:

$$R_p + R_s + \frac{\frac{R_p}{r}\cdot\frac{R_2}{1-r}}{\frac{R_p}{r}+\frac{R_p}{1-r}} = 2R_p + R_s$$

Where $$R_p = \frac{R_T R_F}{R_T R_F}$$

Now $R_p$ varies slightly with temperature while $R_s$ has a fixed value. If $R_s$ is infinite or extremely high, then Equation 10 can be written as follows:

$$\frac{L_o}{E_i} = \frac{1}{2}\frac{\left[\frac{R_T - R_F}{R_T + R_F}\right]^2}{R'_s} \quad R'_s = R_s + 2R_p$$

$$= \frac{1}{2}\frac{r^2}{R'_s}$$

$$= \frac{r^2}{\text{constant}} \quad (13)$$

If instead we make $R_s$ have a finite value but with a resistance change with temperature equal and opposite to that of $2R_p$ i.e.

$$\frac{dR_s}{dt} = \frac{d2R_p}{dt}$$

Then $R_s + 2R_p$=constant.

And Equation 10 can again be expressed as follows:

$$\frac{I\alpha}{E_i} = \frac{\frac{1}{2}r^2}{R_s + 2R_p}$$

$$= \frac{r^2}{\text{constant}}$$

Such a circuit will then have the same value of $A(t)$, i.e. the same temperature coefficient as one in which $R_s$ has a fixed but extremely high value. If in practice $R_s$ was made to have an extremely high value, $I_o$ would be too small to be usable.

Now $$R_p = \frac{R_T R_F}{R_T + R_F}$$

$$= \frac{R_o(1+at)R_F}{R_o(1+at)+R_F}$$

$$\frac{dR_p}{dt} = \frac{aR_o R_F^2}{[R_o(1+at)+R_F]^2}$$

For $$t = 0$$
$$a = .00392$$
$$R_F = .6957 R_o$$

i.e.

$$T = 20° \text{ C.}$$

then $$\left(\frac{d2R_p}{dt}\right)20° = .001322 R_o/° \text{ C.} \quad (14)$$

for $$t = -15$$

i.e.

$$T = 5° \text{ C.}$$

$$\left(\frac{d2R_p}{dt}\right)5° = .001414/° \text{ C.} \quad (15)$$

As can be seen, the change in $R_p$ is fairly constant, i.e. $R_p$ changes almost linearly with temperature. It is possible to use a thermistor which has been modified by means of a shunt resistance to obtain a linear response.

The resistance of a thermistor can be expressed by the following equation:

$$R_{TH} = R'_o e^{B\left(\frac{1}{T} - \frac{1}{T_o}\right)}$$

where $R'_o$=resistance of thermistor at 0° C.
$T_o$=271° K. (=0° C.)
$T$=thermistor temperature (° K.)

If we shunt $R_{TH}$ with a fixed resistor $R_d$, then the resistance of the combination ($R_s$) is given by $$R_s = \frac{R_d \cdot R_o e^{B\left(\frac{1}{T}-\frac{1}{T_o}\right)}}{R_d + R_o e^{B\left(\frac{1}{T}-\frac{1}{T_o}\right)}} \quad (16)$$

If
$$R_d = dR_o$$

Then
$$R_s = R'_o \frac{1}{e^{B\left(\frac{1}{T_o}-\frac{1}{T}\right)}} \quad (17)$$

For a circuit having an equal but opposite resistance change with temperature to that of $2R_p$, then $$\frac{dR_{s1}}{dt_1} = \frac{dR_{s2}}{dt_2} \times \frac{d2R_{p1}}{dt_1} \bigg/ \frac{d2R_{p1}}{dt_2}$$

$R_{s1} = R_s$ at 20° C.

$R_{s2} = R_s$ at 5° C.

$R_{p1} = R_p$ at 20° C.

$R_{p2} = R_p$ at 5° C.

$t_1 = 0$ $t_2 = -15$

From Equations 14 and 15

$$\frac{d2R_{p1}}{dt_1} \bigg/ \frac{d2R_{p2}}{dt_2} = 1.069$$

Now $$\frac{dR_{s1}}{dt_1} = R'_o \left[ \frac{-\frac{R}{T_1^2} e^{B\left(\frac{1}{T_o}-\frac{1}{T_1}\right)}}{\left(e^{B\left(\frac{1}{T_o}-\frac{1}{T_1}\right)}+\frac{1}{d}\right)^2} \right]$$

$T_0 = 273°$ K. (0° C.)

$T_1 = 278°$ K. (5° C.)

$T_2 = 293°$ K. (20° C.)

$B = 2920$ for a typical thermistor (such as Veco 21A4)

By equating $$\frac{dR_{s1}}{dt_1} \text{ and } \frac{dR_{s2}}{dt_2}$$

and simplifying, we get:

$$d = \frac{\sqrt{1.069} - \frac{T_2}{T_1}\sqrt{e^{B\left(\frac{1}{T_2}-\frac{1}{T_1}\right)}}}{\frac{T_2}{T_1} e^{B\left(\frac{1}{T_o}-\frac{1}{T_2}\right)} \cdot \sqrt{e^{B\left(\frac{1}{T_2}-\frac{1}{T_1}\right)}} - e^{B\left(\frac{1}{T_o}-\frac{1}{T_1}\right)} \cdot \sqrt{1.069}}$$

Solving for $\frac{1}{R_0} \cdot \frac{dR_{s2}}{dt_2}$ for $T = 278$, 285.5 and 293° K. and tabulating.

| T, °K. | Temperature (°C.) | $\frac{1}{R'_o} \cdot \frac{dR_s}{dt}$ | $\frac{dR_s}{dt} \times \frac{1}{-.00453}$ |
|---|---|---|---|
| 278 | 5 | −.00484 | 1.069 |
| 286.5 | 12.5 | −.00478 | 1.054 |
| 293 | 20 | −.00453 | 1.000 |

Now from Equation 14

$$\frac{d2R_p}{dt} = .001414 \text{ at } 5° \text{ C.}$$

and to satisfy Equation 13

$$\frac{dR_s}{dt} = -\frac{d2R_p}{dt}$$

from above $$\frac{1}{R_0} \cdot \frac{dR_s}{dt} = -.00484 \text{ at } 5° \text{ C.}$$

and $$\therefore R'_0 = \frac{.001414}{.00484} = 0.290 R_0$$

$R_d = dR_o$
   $= 0.537 \times 0.290 R_o$
   $= 0.1557 R_o$

FIG. 8 shows the complete compensation circuit. The accuracy of compensation should be very close to that shown in Table II for $R_s$=infinity. It should be noted that the thermistor plays a minor role in the compensation network and, in fact, its stability requirements are very low.

FIG. 8 is very similar to the double bridge shown in FIG. 6 except with the inclusion of a thermistor $R_{TH}$ shunted by a resistor $R_D$ connected between points A and B in place of the resistor $R_S$ of FIG. 6. Thermistor $R_{TH}$ is normally mounted on the sensor assembly or otherwise exposed to the temperature of the sea water.

FIG. 9 illustrates a second embodiment of a measuring system for determining the salinity of sea water. The system includes certain similarities to that shown in FIG. 1 and similar elements are given the same reference character. The system of FIG. 9 also includes a compensating network as illustrated in FIG. 9 and elements of the compensating network having the same function are here again given the same reference character.

The system of FIG. 9 includes the temperature-compensating network interconnected with the sensor transformers to form a bridge. The temperature compensating network is adapted to be disposed in the sea water so as to be responsive to the temperature of the water at the situs of the conductivity measurement. By way of example, the network may be mounted on or in the probe o FIG. 5.

The input signal is applied to the winding $W_1$ of transformer $T_1$ and to a quadrature voltage network 500. The output signal from the bridge is taken across winding $W_4$ of transformer $T_2$ and is designated as $E_o$. Transformers $T_1$ and $T_2$ are interconnected through two paths. The first path is through the sea water which has an electrical resistance represented by the resistor $R_W$. The second path is through the temperature compensating network and includes input winding $W_2$ and output winding $W_3$.

The output signal $E_o$ plus the voltage from the network 500 designated as $E_q$ are applied to an amplifier 502. The signal from the amplifier 502 is coupled through a phase shifting network 504 to a second amplifier 506. The phase shifting circuit may be a ladder network composed of resistors $R_1$ and $R_2$ in series and capacitors $C_1$ and $C_2$ in parallel. The output from amplifier 506 is applied to the winding $W_1$ to complete the loop. Also, the gain of amplifier 502 is controlled by an automatic gain control 508 which has as an input a DC feedback signal derived from the AC signal at the output of the amplifier 506. An adjustable resistor 510 is coupled between center taps located on windings $W_2$ and $W_3$ and is adjusted to provide an initial balance of the bridge circuit.

The salinity of the sea water is monitored by the system shown in FIG. 9. The information is transmitted with high accuracy by a phase shift type oscillator in which the salinity sensing bridge becomes part of the phase shifting network. The remaining phase shift is supplied by the network 504 so as to provide regenerative feedback to the amplifier 506 and produce an oscillating input signal $E_i$. The error voltage $E_o$ from the salinity bridge is either in phase or 180° out of phase with the bridge input voltage $E_i$ providing that $R_{F1}$ and $R_{T1}$ are very small compared with the excitation impedance of $W_3$. The error voltage $E_o$ is added to a voltage $E_q$ produced by the quadrature voltage network 500 that is 90° out of phase with $E_i$. The phase of $E_o+E_q$ shifts as the value of $E_o$ changes in accordance with changes in the balance of the bridge. The balance of the bridge is directly related to the salinity of the sea water. The change in phase of $E_o+E_q$ in relation to $E_i$ determines the frequency of the oscillator.

The salinity of the sea water may be directly measured by monitoring the changes in frequency of the oscillator. As an alternative method of measurement, the variable resistance element 510 may be adjusted to rebalance the bridge and the amount of adjustment necessary is an indication of the salinity of the sea water. It will be appreciated that the balanced condition of the bridge may be determined by the frequency of the phase shift oscillator.

It will also be appreciated that the variation in frequency of the phase shift oscillator may be accomplished by other means than the quadrature voltage network 500. For example, a capacitor may be included within the salinity bridge structure and the output from the bridge may be taken across the capacitor so that changes in the bridge balance are directly reflected as phase changes in the output signal $E_o$.

FIG. 10 shows a third embodiment of a measuring system similar to that shown in FIG. 9 except including pressure compensation. Elements having the same function as those shown in FIG. 9 are given the same reference character. A pressure compensator 600 derives an input signal from the input to the bridge winding $W_1$. The output $E_p$ from the pressure compensator is present as an added component of the signal applied to the amplifier 502 and supplies a signal which directly compensates for changes in pressure of the sea water. The signal $E_p$ is also compensated for temperature changes which affect the pressure coefficient.

FIG. 11 illustrates a circuit which may be used for the pressure compensator 600 shown in FIG. 10. The input signal $E_i$ is applied to a circuit including a resistor 602 in series and a thermistor 604 connected in parallel. A second resistor 606 in series is connected between the juncture of resistors 602 and thermistor 604 and one terminal of a potentiometer 608. The potentiometer 608 has its other terminal connected to a reference potential. The output $E_p$ is taken across a resistor 612 coupled between the output arm of the potentiometer 608 and the reference potential. The potentiometer 608 is controlled by a pressure-responsive device 614, for example, a Bourdon tube, to drive the movable arm of the potentiometer in accordance with the pressure of the sea water. The combination of the potentiometer and the resistor 612 modifies the output signal to closely simulate the non-linear conductivity-pressure relationship of sea water.

The thermistor 604 is used to compensate for changes in the pressure coefficient at different temperatures.

The temperature variations in the pressure coefficient may be closely simulated by the change in resistance of the combination of the thermistor 604 and the resistor 602.

What is claimed is:

1. In combination for measuring the salinity of sea water,
    a first winding disposed in said sea water,
    first means coupled to the first winding for introducing an input signal to said first winding,
    a second winding disposed in said sea water and magnetically coupled to said first winding through said sea water to obtain the production of a first signal in said second winding in accordance with the salinity of said sea water,
    second means for developing a second signal having a particular phase relationship transverse to the phase of said first signal,
    third means responsive to the first and second means for combining the first and second signals to produce a resultant signal having a phase dependent upon the characteristics of said first signal, and
    fourth means coupled to said first winding and said first means for introducing the resultant signal to said first winding to obtain the production by said second winding of the first signal with frequency characteristics dependent upon the salinity of said sea water.

2. The combination set forth in claim 1 wherein at least one of said first and second windings is connected in a bridge circuit having characteristics of altering the characteristics of said first signal in accordance with the temperature of the sea water.

3. The combination set forth in claim 1 wherein said first winding is connected in a first bridge circuit and said second winding is connected in a second bridge circuit and wherein said first and second bridge circuits are connected to each other and wherein said bridge circuits are responsive to the temperature of said sea water for altering the characteristics of said first signal to compensate for changes in the temperature of said sea water.

4. In combination for measuring the salinity of sea water,
    a first winding disposed in said sea water,
    a second winding disposed in said sea water in magnetically coupled relationship to said first winding,
    first means coupled to said first winding for introducing a first signal to said first winding to obtain the induction in said second winding of a second signal having characteristics dependent upon the salinity of said sea water,
    an impedance disposed in said sea water and having variable characteristics dependent upon the variations in temperature of said sea water,
    bridge means including at least one of said first and second windings and including said impedance for providing variations in the characteristics of said second signal in accordance with the variations in the characteristics of said impedance,
    second means coupled to said second winding for combining said second signal with a third signal having a quadrature component to the first signal to produce a resultant signal having a phase dependent upon the characteristics of said second signal, and
    third means coupled to said second means and said first winding for introducing the resultant signal to said first winding to provide said second signal with a frequency representing the salinity of said sea water.

5. The combination set forth in claim 4, including means coupled to said third means for controlling the amplitude of said resultant signal to make the frequency of said resultant signal dependent substantially only upon the salinity of said sea water.

6. The combination set forth in claim 4, wherein the bridge means constitutes first and second bridges connected to each other and wherein said first winding is included in said first bridge and said second winding is included in said second bridge and an impedance is connected between said first and second bridges and said impedance is provided with variable characteristics dependent upon the temperature of said sea water.

7. In combination for measuring the salinity of sea water,
    a first winding disposed in said sea water,
    a second winding disposed in said sea water and magnetically coupled to said first winding through said sea water,
    first means coupled to said first winding for introducing an input signal to said first winding to obtain the induction of an output signal in said second winding in accordance with the salinity of said sea water,
    second means coupled to said second winding for shifting the phase of said signal from said second winding in accordance with the characteristics of the signal from said second winding, and third means coupled to said second means for operating upon said phase-shifter signal to provide the input signal with characteristics for obtaining for the output signal a frequency representing the salinity of said sea water.

8. The combination set forth in claim 7 wherein means are responsive to the output signal from the second winding for varying the characteristics of the output signal in accordance with variations in the pressure of the sea water to compensate for such variations in pressure.

9. The combination set forth in claim 8 wherein bridge means are connected to at least one of the first and second windings and are responsive to variations in the temperature of the sea water to vary the characteristics of the output signal for compensation of such variations in temperature.

References Cited

UNITED STATES PATENTS 3,151,293  9/1964  Blake et al. _____ 324—30

OTHER REFERENCES

Brown, Neil L. and Hamon, B. V., "An Inductive Salinometer," Deep-Sea Research, June 1961, vol. 8, Pergamon Press Ltd., London; pages 65–72 of pages 65–75 relied on.

RUDOLPH V. ROLINEC, Primary Examiner

C. F. ROBERTS, Assistant Examiner

U.S. Cl.X.R.

324—57